Nov. 22, 1966 A. G. POKRANT 3,287,608

TIME DELAY CONTROL CIRCUIT

Filed June 3, 1963

INVENTOR.
Adolf G. Pokrant.
BY
W. L. Stout
HIS ATTORNEY

United States Patent Office 3,287,608

Patented Nov. 22, 1966

3,287,608

TIME DELAY CONTROL CIRCUIT

Adolf G. Pokrant, Braddock Hills, Pa., assignor to Westinghouse Air Brake Company, Swissvale, Pa., a corporation of Pennsylvania Filed June 3, 1963, Ser. No. 285,047
1 Claim. (Cl. 317—142)

This invenion relates to a time delay control circuit for delaying a switching operation controlled by the circuit by an adjustable, predetermined interval of time after the occurrence of a time initiating signal.

This invention can be employed to control a function such as the pickup or release of an electrical relay or other electromechanical device and to cause this function to occur by a predetermined, adjustable time after the occurrence of a time initiating signal such as the opening or closing of a switch or the contacts of another relay.

It is an object of this invention to provide such a time delay circuit employing transistor elements.

Another object of this invention is to provide means in a time delay circuit which will overcome interference by the inductive effect of the load circuit with proper function of the switching operation within the established time interval and which will accurately repeat the selected delay time on consecutive cycles of operation.

Another object of this invention is to develop a time delay circuit based upon a novel form of transistorized, Schmitt trigger circuit which imposes relatively low power dissipation loads on the transistors during the time a switching operaton is taking place.

It is a further object of this invention to provide a time delay circuit for which the delay period will be substantially unaffected by changes in power supply voltage.

This invention also has for an object to teach the construction of a time delay control circuit which permits the use of less expensive capacitor elements having a lower voltage rating than would heretofore be required and which permits the use of capacitors of less capacity to obtain an equally long time delay as could be obtained with other circuits.

These and other objects of the invention will become readily apparent as it becomes better understood by reference to the following detailed description when considered in connection with the accompanying drawings wherein.

Time delay control circuits which will switch on or off an electrical load circuit at a time delayed from an initial time by a determinable adjustable period have been used before in the art. However, prior delay circuits employ relatively large resistor-capacitor networks and require capacitors which have a relatively high voltage rating approaching the power supply voltage to obtain delay times of the order of some several tenths of a second to several seconds; the time period varies, radically with fluctuations in power supply voltage applied to the circuit and relatively wide variations occur in the period of delay on consecutive cycles of operation.

In addition, if an ordinary Schmitt trigger circuit were used to switch a load circuit comprising the winding of an electromechanical device such as a relay or solenoid, the switching circuit would be subjected to transients causing spurious intermittent operation of the first stage transistor during the time when the load circuit was being switched on.

Applicant's invention permits the use of less expensive capacitor elements of small capacity and having a lower voltage rating than would heretofore be possible to obtain an equally long delay time. Applicant's invention is capable of accurate repetition of the selected delay time over many cycles of operation even though there may be variation of power supply voltage. It insures positive switching action and prevents overloading of the switching transistors.

Figure 1:
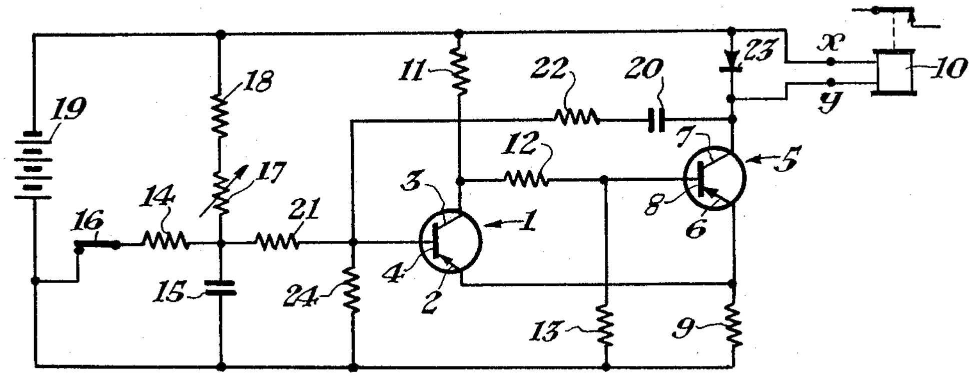
FIGURE 1 is a schematic drawing of the construction of a time delay control circuit embodying the invention which can be used to delay the switching off of a load circuit.

In the embodiment of the invention shown in FIGURE 1 the load circuit is illustrated as a relay coil 10 presenting an inductive load to the control circuit. Numerals 1 and 5 indicate a pair of PNP junction transistors connected as a Schmitt trigger circuit with a common emitter resistor 9. When connected as shown with switch 16 closed the circuit will attain a stable condition in which transistor 5 conducts heavily with only a small voltage drop between its emitter 6 and collector 7 and transistor 1 is cut off. Substantially full battery voltage will be divided between the load circuit across terminals X–Y and resistor 9. Forward current to base 8 of transistor 5 flows through resistors 11 and 12 in series. Reverse current flows through resistor 13. The negative potential developed across resistor 9 by current flowing through transistor 5 is applied to the emitter 2 of transistor 1. Resistor 14 which is connected across capacitor 15 is of very low value compared to resistors 17 and 18 so that the voltage across capacitor 15, with switch 16 closed, is only a few tenths of a volt and consequently base 4 of transistor 1 is held at a positive potential with respect to its emitter 2. Therefore, transistor 1 is held cut off.

Switch 16 may be any type of switching device, such as the contacts of a relay, controlled by a function whose occurrence is to be reckoned as the start of the time delay interval.

If the circuit comprising resistors 14, 17 and 18 and battery 19 is interrupted by opening switch 16, capacitor 15 will begin to charge through resistors 17 and 18 and the voltage at the junction of capacitor 15 and resistor 17 becomes more negative until transistor 1 starts to conduct. The voltage developed across resistor 9 to hold transistor 1 cut off is in the order of only a few volts. Therefore, capacitor 15 needs to charge only to a few volts to begin the switching action and can be of a relatively low voltage rating.

With transistor 1 conducting, collector current through resistor 11 will cause the potential at the junction of resistors 11 and 12 to change in a positive direction. This changing potential is applied to base 8 of transistor 5 through resistor 12 causing transistor 5 to conduct less. As transistor 5 current decreases the voltage at the junction of resistor 9 and emitter 6 becomes more positive. This positive going voltage is applied to emitter 2 causing transistor 1 to conduct more and to develop a more positive voltage in its collector circuit. The action described above continues until transistor 5 is cut off. At this time the load circuit is switched off. The inductive transients developed when current is interrupted in the load circuit are kept from affecting the trigger circuit by diode 23 connected across the load.

The time required for a complete change of state of the trigger circuit once transistor 1 starts to conduct is in the order of about 1 microsecond. Since the total delay time sought is in the order of from several tenths of a second to several seconds, the time for change of state of the trigger circuit has no practical effect on the total delay time. Therefore, the time interval between the opening of switch 16 and the switching off of the load circuit is determined by the charging time of capacitor 15, which in turn, is a function of its capacity and the resistance of resistors 17 and 18. Resistor 18 provides minimum resistance in the charging circuit and minimum delay time. Resistor 17 is a variable resistor which permits changing the delay time.

In time delay circuits of the prior art using a capacitor charge time as the delay period, the slope of the charging curve changes if the supply voltage changes but the end voltage to which the capacitor must charge the effect switching remains substantially the same. Thus, the delay time is greatly affected by changes in power supply voltage. In the trigger circuit of this invention any change in power supply voltage which affects the current in the load circuit produces a corresponding effect on the voltage developed in the common emitter resistor 9. This changes in substantially the same degree the reverse bias voltage on the first stage transistor so that the time required for capacitor 15 to charge to the reverse bias voltage and permit transistor 1 to conduct remains practically constant.

When switch 16 is again closed, capacitor 15 will start to discharge through current limiting resistor 14 and switch 16. The voltage at base 4 will change in a positive direction and transistor 1 will conduct less. The voltage at the junction of resistors 11 and 12 will change in a negative direction and be applied to base 8 of transistor 5. Current through resistor 9 will decrease and the voltage at emitter 6 will change in a positive direction until transistor 5 starts to conduct and the load circuit is again switched on. Transistor 1 will again be cut off and the control circuit will be ready for another timing cycle. Resistor 24 provides a path for transistor 1 reverse current and in conjunction with resistors 17, 18 and 21, forms a voltage divider network which maintains a reverse bias on transistor 1 when the trigger circuit is in its stable condition with transistor 5 conducting.

With a load comprising the winding of an electromechanical device such as the relay in FIGURE 1 the current in the load circuit would rise after the load circuit was switched on until the relay operated. At this point there would be a momentary substantial drop in current through transistor 5 due to the change in inductance of the load. This reduction in current would produce a positive pulse across common emitter resistor 9 which would be applied to the emitter of transistor 1. Meanwhile the voltage at the base of transistor 1 is dependent on the voltage maintained by capacitor 15 which is still discharging through resistor 14. Therefore, transistor 1 could be driven into a spurious period of conduction which could interfere with smooth operation of the switching circuit. Furthermore, this spurious conduction would occur with a relatively high voltage between the emitter 2 and collector 3 of transistor 1 and would impose a high dissipation requirement on it. To avoid this possibility a feedback network comprising resistor 22 and capacitor 20 is connected between the collector of transistor 5 and the base of transistor 1. When transistor 5 starts to conduct a positive pulse develops at its collector 7. This positive pulse is coupled through resistor 22 and capacitor 20 to the base of transistor 1. The pulse is of sufficient magnitude and duration to maintain reverse bias on transistor 1 during the time the transient occurs due to operation of the relay. Thus transistor 1 is kept cut off. This insures positive switching action. Resistor 21 prevents feedback voltage applied to the base of transistor 1 from being bypassed through capacitor 15.

Figure 2:
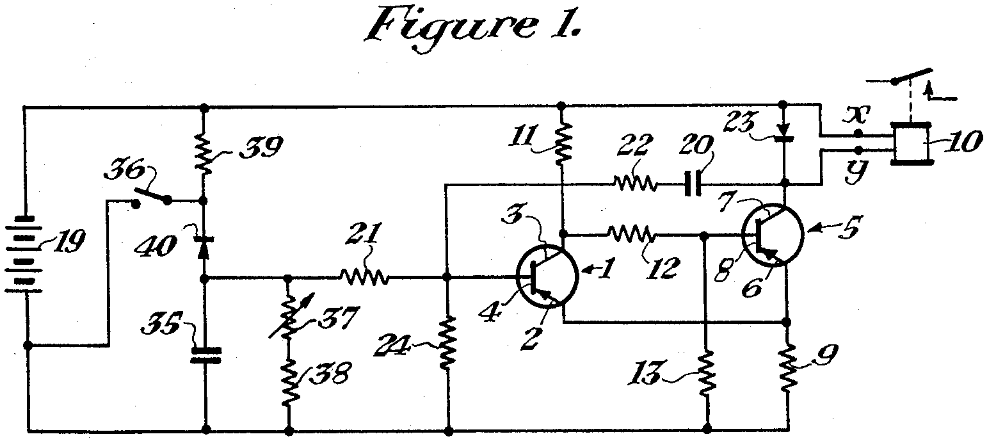
FIGURE 2 is a schematic drawing of a circuit similar to that shown in FIGURE 1 but modified to delay the switching on of a load circuit.

Looking now more specifically at FIGURE 2, it will be seen that the trigger circuit and external load circuit are substantially similar to those in FIGURE 1. The time circuitry, however, is arranged so that the delay occurs in switching on the load circuit rather than in switching it off.

When battery 19 is connected to the circuit in FIGURE 2 with switch 36 in its normally open position, the circuit reaches a steady state condition in which capacitor 35 is fully charged applying a forward bias to base 4 of transistor 1, transistor 1 conducts heavily and transistor 5 is cut off.

When switch 36 is closed, the junction of resistor 39 and diode 40 is placed at positive battery potential. Capacitor 35 cannot discharge through diode 40 but does discharge through resistors 37 and 38 in parallel with resistor 21, transistor 1 and resistor 9. The discharge time of capacitor 35 is determined by its capacity and the effective resistance of the discharge circuit. Resistor 37 is adjustable to control the discharge circuit time constant. As the negative value of the voltage at the junction of capacitor 35 and diode 40, and consequently at base 4, decreases, transistor 1 will conduct less and the current through resistor 9 will decrease.

As transistor current decreases the voltage at emitter 6 of transistor 5 changes in a positive direction. At the same time, transistor 1 collector current decreases applying a more negative voltage to the base of transistor 5. The action of the Schmitt trigger circuit will then be effective to cause transistor 5 to conduct at its maximum capacity and transistor 1 to be cut off. Thus the load circuit is switched on at a time delayed from the closing of switch 36 determined by the constants of the control circuit and adjustable by means of variable resistor 37. As explained above in connection with FIGURE 1, with a relay, solenoid or other electromechanical device as the load circuit, resistor 22 and capacitor 20 are effective after transistor 1 is cut off to prevent spurious periods of conduction of transistor 1 due to voltage transients caused by change in inductance of the load circuit when the device operates. When switch 36 is opened, capacitor 35 will again charge causing transistor 1 to conduct. Transistor 5 will be cut off and the load circuit will be switched off.

Figure 3:
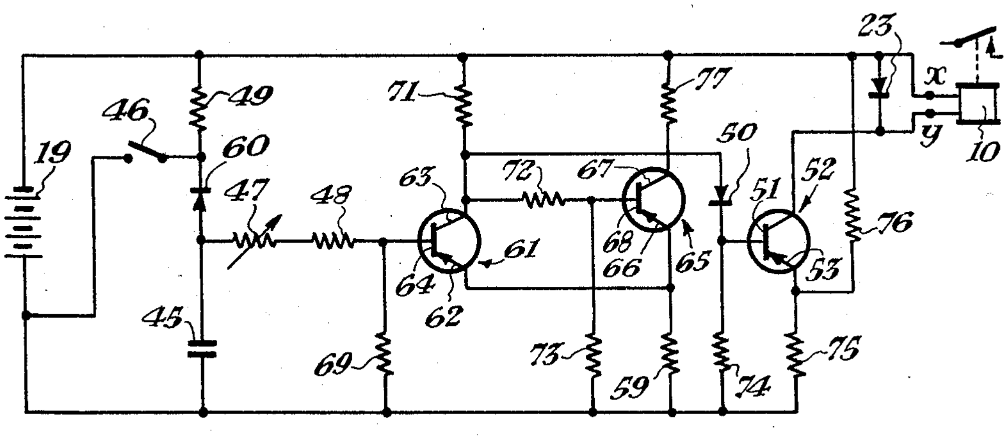
FIGURE 3 is a schematic drawing of an embodiment of the invention which can be used to delay the switching on of a load circuit and so constructed to permit longer delay times with a given capacity.

The circuit shown in FIGURE 3 shows a transistorized time delay circuit employing a Schmitt trigger circuit and constructed to eliminate load current from the trigger circuit. This permits the use of higher impedances in the charging and trigger circuits to provide longer delay times with relatively lower voltages or with less total capacity.

In FIGURE 3 when battery 19 is connected to the circuit with switch 46 in its normally open position the circuit assumes a steady state condition in which capacitor 45 is fully charged, transistor 61 is conducting heavily and transistor 65 is cut off. Zener diode 50 is cut off. Base 51 of transistor 52 is connected to battery through resistor 74 and with diode 50 cut off base 51 is substantially at positive battery potential. Resistors 75 and 76 form a voltage divider network which places a voltage on emitter 53 negative with respect to the potential on base 51. Transistor 52, therefore, is held cut off by reverse bias.

When switch 46 is closed capacitor 45 will discharge through resistors 47 and 48 in series with a parallel circuit comprising resistor 69 in one branch and transistor 61 and common emitter resistor 59 in the other branch. As capacitor 45 discharges base 64 of transistor 61 becomes more positive and transistor 61 conducts less reducing the current through resistor 59 and causing the voltage at emitter 66 of transistor 65 to become more positive. Collector 63 current decreases and the voltage at the junction of resistors 71 and 72 becomes more negative causing a more negative voltage to appear at the base 68 of transistor 65 and transistor 65 will start to conduct. With transistor 65 conducting the voltage developed across resistor 59 and applied to emitter 62 becomes more negative. This action continues until transistor 61 is cut off and transistor 65 is conducting heavily. At the point when the voltage across Zener diode 50 becomes sufficient to cause breakdown, diode 50 conducts heavily applying to the base 51 of transistor 52 a voltage determined by the relative values of resistors 74 and 71 and negative with respect to the voltage at the emitter 53. Transisor 52 is driven into conduction switching on the load circuit.

The use of Zener diode 50 stabilizes the voltage applied to base 51 of transistor 52 and insures that it is of sufficient magnitude to overcome the reverse bias and drive transistor 52 into conduction instantaneously. The time delay period can be varied by adjusting variable resistor 47.

When switch 46 is again opened capacitor 45 will charge through resistor 49 and diode 60 until transistor 61 starts to conduct. The trigger circuit will again change over with transistor 61 conducting and transistor 65 becoming cut off. The voltage at collector 63 of transistor 61 will become more positive, Zener diode 50 will cut off and the voltage at base 51 of transistor 52 will change in a positive direction cutting off transistor 52. This switches off the load circuit and restores the control circuit to its beginning conditon ready for another cycle.

Since transistors 61 and 65 do not carry load current, the components in their circuits and in the capacitor charge circuits may be of relatively high impedance and the current in these circuits kept small. This results in low dissipation requirements on the transistors and permits the use of a capacitor with less capacity to produce the same time delay as in the circuits shown in FIGURES 1 and 2 or if the capacity in the timing circuit remains the same a longer timing cycle can be obtained.

From the above description it may readily be seen that the invention makes it possible to provide an improved time delay circuit to control the switching on or off of a load circuit including an electromechanical device. Of course, the invention may be used with other types of load circuits.

Obviously, many modifications and variations of the present invention are possible in the light of the above teachings. It is therefore to be understood that within the scope of the appended claims the invention may be practiced otherwise than as specifically described.

Having thus described my invention, what I claim is:

In a time delay control device for switching electrical power from a power source to an inductive load whose inductance is subject to abrupt variation during the first moments of application of power thereto;

(a) said time delay control device including a first transistor having a base, a collector and an emitter,
said collector electrically connected to said inductive load and said emitter electrically connected to said power source,
said transistor in a normally conducting condition through which current is applied to said inductive load, (b) a normally nonconducting second transistor having a base, a collector and an emitter,
said emitter of said second transistor and said emitter of said first transistor electrically interconnected,
said collector of said second transistor electrically connected to said base of said first transistor, (c) time delay means controlled by a time initiating signal, said time delay means electrically connected to said power source and to said base of said second transistor,
said time delay means causing said second transistor to begin conduction at a predetermined time interval following occurrence of said time initiating control signal,
said time delay means simultaneously causing said first transistor to become nonconducting through said electrical connection between said second transistor collector and said first transistor base, thereby switching off current to said inductive load from said power source, (d) restoring means electrically connected to said base of said second transistor and said electrical connection between said first transistor base and said second transistor collector, said restoring means including in part said time delay means,
said restoring means restoring said second transistor to its normally nonconducting condition and said first transistor to its normally conducting condition, thereby switching on current to said inductive load, (e) a feedback network comprising a resistor and a capacitor in series electrically connected between said collector of said first transistor and said base of said second transistor,
said feedback network providing an inductive load transient voltage suppression function in that said capacitor which is charged to a voltage level, impresses a voltage upon said base of said second transistor of sufficient magnitude and duration to maintain said second transistor nonconducting,
said charged capacitor is effective during the initial moments of said first transistor's conduction when said inductive load is receiving power through said first transistor and the current in said first transistor is changing due to variations of inductance, said charged capacitor thereby prevents periods of conduction of said second transistor due to voltage transients caused by said variations of inductance of said inductive load and said changing current in said first transistor when the inductive load is initially caused to be energized.

References Cited by the Examiner

UNITED STATES PATENTS

| | | | |
|---|---|---|---|
| 2,923,863 | 2/1960 | Chesson et al. | 317—148.5 |
| 2,924,724 | 2/1960 | Booker. | |
| 2,963,596 | 12/1960 | Bross. | |
| 2,977,510 | 3/1961 | Adamson et al. | |
| 3,018,420 | 1/1962 | Norris | 317—148.5 |
| 3,125,707 | 3/1964 | Culbertson | 317—142 |

MILTON O. HIRSHFIELD, *Primary Examiner.*

SAMUEL BERNSTEIN, *Examiner.*

L. T. HIX, *Assistant Examiner.*